(12) United States Patent
Kobayashi

(10) Patent No.: US 11,247,317 B2
(45) Date of Patent: Feb. 15, 2022

(54) CONTROL DEVICE AND WORK MANAGEMENT SYSTEM USING SAME

(71) Applicant: Panasonic Intellectual Property Management Co., Ltd., Osaka (JP)

(72) Inventor: Hiroji Kobayashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/358,692

(22) Filed: Mar. 19, 2019

(65) Prior Publication Data
US 2019/0217455 A1    Jul. 18, 2019

Related U.S. Application Data

(63) Continuation of application No. 15/315,404, filed as application No. PCT/IB2015/000818 on Jun. 3, 2015, now abandoned.

(30) Foreign Application Priority Data

Jun. 4, 2014    (JP) .................................. 2014-116052

(51) Int. Cl.
   *B25B 23/14*    (2006.01)
   *B25B 21/02*    (2006.01)
   (Continued)

(52) U.S. Cl.
   CPC ............ *B25B 23/14* (2013.01); *B25B 13/463* (2013.01); *B25B 21/02* (2013.01);
   (Continued)

(58) Field of Classification Search
   CPC ....... B25B 23/14; B25B 21/002; Y02P 90/04; Y02P 90/22; Y02P 90/10; Y02P 90/02;
   (Continued)

(56) References Cited

U.S. PATENT DOCUMENTS 476,801 A    6/1892 Leary
5,727,300 A *  3/1998 Ekdahl ..................... B21J 15/10
                                                29/407.04
(Continued)

FOREIGN PATENT DOCUMENTS

JP    2004-522604 A    10/1996
JP    2008-009868 A    10/1996
(Continued)

OTHER PUBLICATIONS

U.S. Final Office Action dated Jun. 12, 2019 issued in corresponding U.S. Appl. No. 15/315,404.
(Continued)

*Primary Examiner* — Darrin D Dunn
(74) *Attorney, Agent, or Firm* — Renner, Otto, Boisselle & Sklar, LLP

(57) ABSTRACT

A control device is provided with a communication unit and a processing unit. The communication unit makes communication with a tool that is used for the work of fastening a fastener (for example, a screw) and with an image pickup unit for capturing an image of the work site where the work is being performed. The processing unit executes a determination process of determining whether or not the work is being performed normally on the basis of the fastening torque applied to the fastener by the tool and the image captured by the image pickup unit.

10 Claims, 6 Drawing Sheets

(51) Int. Cl.
  *B25B 23/142* (2006.01)
  *G06T 7/00* (2017.01)
  *B25B 13/46* (2006.01)
  *B25B 23/147* (2006.01)
  *G06Q 10/08* (2012.01)

(52) U.S. Cl.
  CPC ...... *B25B 23/1425* (2013.01); *B25B 23/1475* (2013.01); *G06Q 10/087* (2013.01); *G06T 7/001* (2013.01); *G06T 7/0008* (2013.01); *G06T 2207/30164* (2013.01)

(58) Field of Classification Search
  CPC ....... B23P 19/06; B23P 19/04; B23P 2700/01; B25J 9/1633; B25J 9/1687; B25J 9/1697; B25J 9/02; G05B 19/41875; G05B 19/41805; G05B 19/4183; G05B 2219/31027; G05B 2219/31304; G05B 2219/40053; G05B 2219/40537; G05B 2219/40583; G05B 2219/45127; G05B 2219/45203; G05B 2219/37205; G05B 2219/31046; G05B 2219/31047; G05B 2219/32001; G05B 2219/40565
  See application file for complete search history.

(56) References Cited

U.S. PATENT DOCUMENTS

| | | | |
|---|---|---|---|
| 6,477,437 B1 | 11/2002 | Hirota | |
| 6,762,426 B1* | 7/2004 | Gilliam | G01V 8/10 250/559.12 |
| 7,035,877 B2 | 4/2006 | Markham | |
| 7,515,981 B2 | 4/2009 | Ryznar | |
| 7,698,010 B2* | 4/2010 | Cannedy | G05B 19/406 700/96 |
| 8,155,790 B2 | 4/2012 | Oga | |
| 8,442,685 B2 | 5/2013 | Ooga | |
| 8,947,456 B2 | 2/2015 | Chen | |
| 8,978,967 B2 | 3/2015 | Gamboa | |
| 9,256,220 B1 | 2/2016 | Coffland | |
| 9,372,278 B2 | 6/2016 | Lopetrone | |
| 9,427,852 B2 | 8/2016 | Mizuno | |
| 9,658,614 B2 | 5/2017 | Ryznar | |
| 9,898,705 B2 | 2/2018 | Kahle | |
| 10,528,036 B2* | 1/2020 | Ryznar | G05B 19/418 |
| 2001/0034572 A1 | 10/2001 | Yamaguchi | |
| 2004/0114133 A1 | 6/2004 | Furiya | |
| 2004/0129090 A1 | 7/2004 | Schoeps | |
| 2005/0094868 A1 | 5/2005 | Jones | |
| 2005/0109519 A1 | 5/2005 | Kawai | |
| 2005/0147290 A1 | 7/2005 | Ong | |
| 2005/0155915 A1 | 7/2005 | Ong | |
| 2005/0203679 A1 | 9/2005 | Hisada | |
| 2006/0144158 A1* | 7/2006 | Hartmann | G01B 11/2425 73/761 |
| 2006/0244953 A1* | 11/2006 | Wei | G01N 21/952 356/237.1 |
| 2007/0078846 A1 | 4/2007 | Gulli | |
| 2007/0103104 A1 | 5/2007 | May | |
| 2007/0180674 A1 | 8/2007 | Morden | |
| 2007/0273610 A1 | 11/2007 | Baillot | |
| 2008/0115589 A1 | 5/2008 | DeRose | |
| 2008/0177417 A1 | 7/2008 | Kasuga | |
| 2008/0178713 A1 | 7/2008 | Long | |
| 2008/0319570 A1 | 12/2008 | Van | |
| 2009/0192644 A1 | 7/2009 | Meyer | |
| 2009/0198464 A1* | 8/2009 | Clarke | G05B 19/41875 702/82 |
| 2009/0320653 A1 | 12/2009 | Coffland | |
| 2009/0326699 A1* | 12/2009 | Coffland | B25B 23/1425 700/108 |
| 2010/0125460 A1 | 5/2010 | Mellott | |
| 2010/0125790 A1 | 5/2010 | Erskin | |
| 2010/0153025 A1 | 6/2010 | Ling | |
| 2011/0060460 A1 | 3/2011 | Oga | |
| 2011/0082576 A1 | 4/2011 | Gamboa | |
| 2011/0113613 A1* | 5/2011 | Gamboa | B25B 13/00 29/525.01 |
| 2012/0062725 A1* | 3/2012 | Wampler, II | G01V 8/12 348/86 |
| 2012/0165986 A1 | 6/2012 | Fuhlbrigge | |
| 2012/0310398 A1 | 12/2012 | Rataul | |
| 2013/0073084 A1 | 3/2013 | Ooga | |
| 2013/0133912 A1 | 5/2013 | Mizuno | |
| 2013/0138466 A1* | 5/2013 | Kahle | G06Q 10/063114 705/7.15 |
| 2013/0144416 A1* | 6/2013 | Rataul | G05B 19/41865 700/95 |
| 2013/0286187 A1 | 10/2013 | Slesinski | |
| 2013/0311578 A1 | 11/2013 | Yanagihara | |
| 2014/0259644 A1 | 9/2014 | Matsuo | |
| 2015/0012171 A1* | 1/2015 | Richter | B64F 5/60 701/32.9 |
| 2015/0021062 A1 | 1/2015 | Sekino | |
| 2015/0153747 A1 | 6/2015 | Tanabe | |
| 2015/0189238 A1 | 7/2015 | Ishiyama | |
| 2015/0290811 A1 | 10/2015 | Everard | |
| 2015/0294143 A1 | 10/2015 | Wells | |
| 2015/0346383 A1* | 12/2015 | Lopetrone | B23P 21/002 356/72 |
| 2016/0209836 A1* | 7/2016 | Rataul | G05B 19/41865 |
| 2016/0266046 A1* | 9/2016 | Kuai | G01N 21/8806 |
| 2016/0358324 A1* | 12/2016 | Sugimoto | B33Y 50/00 |
| 2017/0197302 A1 | 7/2017 | Kobayashi | |
| 2017/0255186 A1 | 9/2017 | Ryznar | |
| 2017/0287147 A1 | 10/2017 | Takahashi | |
| 2018/0295248 A1* | 10/2018 | Fielding | G03G 15/607 |
| 2019/0143526 A1* | 5/2019 | Everard | G06K 9/00771 348/92 |
| 2019/0217455 A1* | 7/2019 | Kobayashi | B25B 23/1425 |
| 2019/0333204 A1* | 10/2019 | Uchida | B23P 19/06 |
| 2019/0354753 A1* | 11/2019 | Worrall | G06K 9/00087 |
| 2020/0143195 A1* | 5/2020 | Montano | G06K 9/6201 |

FOREIGN PATENT DOCUMENTS

| | | |
|---|---|---|
| JP | H08-278116 A | 10/1996 |
| JP | 2012-048510 A | 7/2004 |
| JP | 2013-016020 A | 1/2008 |
| JP | 2013-188858 A | 3/2012 |
| WO | WO-2014206631 A | 1/2013 |

OTHER PUBLICATIONS

International Search Report dated Aug. 25, 2015 for corresponding International Application No. PCT/IB2015/000818.

* cited by examiner

FIG.6A
FIG.6B
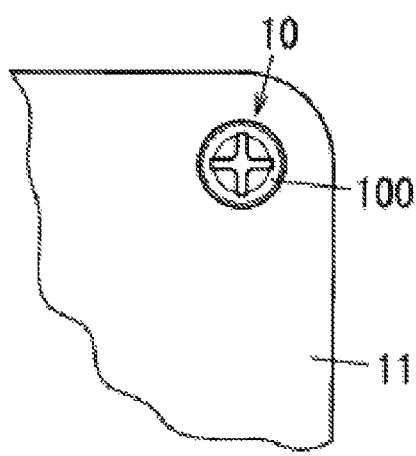
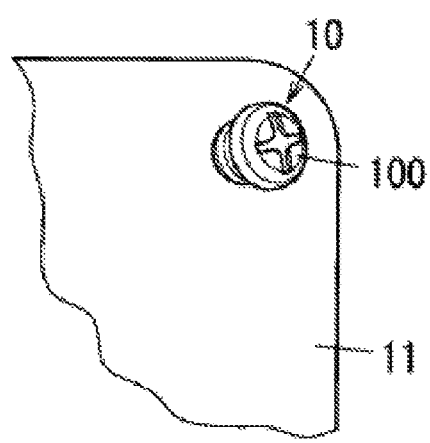

CONTROL DEVICE AND WORK MANAGEMENT SYSTEM USING SAME

TECHNICAL FIELD

The present invention relates generally to a control device and a work management system and, more particularly, to a control device for managing a work using a tool and a work management system using the same.

BACKGROUND ART

Conventionally, in a work of fastening (tightening) a fastener such as a bolt to a predetermined position on a target object, there is known a fastening management system or fastening tool provided with a device or mechanism for preventing an omission of fastening (see, e.g., Patent Document 1). The fastening management system according to Patent Document 1 includes a torque wrench serving as a fastening tool and a management device for managing fastening position information.

The torque wrench outputs a fastening torque, which is applied to fasten the fastener, to the management device through wireless communication. Further, the torque wrench specifies a fastening position based on signals outputted from an acceleration sensor, a gyro sensor and a geomagnetic sensor when the torque wrench has been moved. Then, the torque wrench outputs fastening position information indicating the fastening position to the management device via, e.g., a wireless communication medium. The management device acquires the fastening torque and the fastening position information outputted from the torque wrench via a communication medium to thereby manage the acquired fastening torque and fastening position information.

Patent Document 1: Japanese Unexamined Patent Application Publication No. 2013-188858

However, in the conventional example, although it is possible to perceive a position where the worker fastens the fastener by using the tool (i.e., a position where the work using the tool is done by the worker), it is impossible to check a state of the work using the tool, which is problematic. For example, even though the worker thinks that the fastener has been fastened, actually, the fastener may not be fastened correctly. In this case, it is impossible to check whether or not the fastener has been fastened correctly and successfully (i.e., the state of the work using the tool) in the above conventional example.

SUMMARY OF THE INVENTION

In view of the above, the present invention provides a control device capable of checking a state of a work using a tool and a work management system using the control device.

In accordance with an embodiment of the present invention, there is provided a control device including: a communication unit configured to make communication with a tool used during a work of fastening a fastener and further make communication with an image pickup unit configured to capture an image of a working site where the work is performed; and a processing unit configured to execute a determination process of determining whether or not the work is being performed successfully based on a fastening torque applied to the fastener by the tool and the image captured by the image pickup unit.

In accordance with another embodiment of the present invention, there is provided a work management system including: the control device described above; the tool including a communication unit configured to transmit data of the fastening torque to the control device; and a wearable device including a communication unit configured to transmit data of the image pickup unit and the captured image to the control device.

With such configuration, it is possible to check a state of the work using the tool.

BRIEF DESCRIPTION OF THE DRAWINGS

FIGS. 6A and 6B respectively show a state in which a screw is tightened correctly and a state in which the screw is tightened incorrectly in the work management system according to the embodiment.

DETAILED DESCRIPTION

Figure 1:
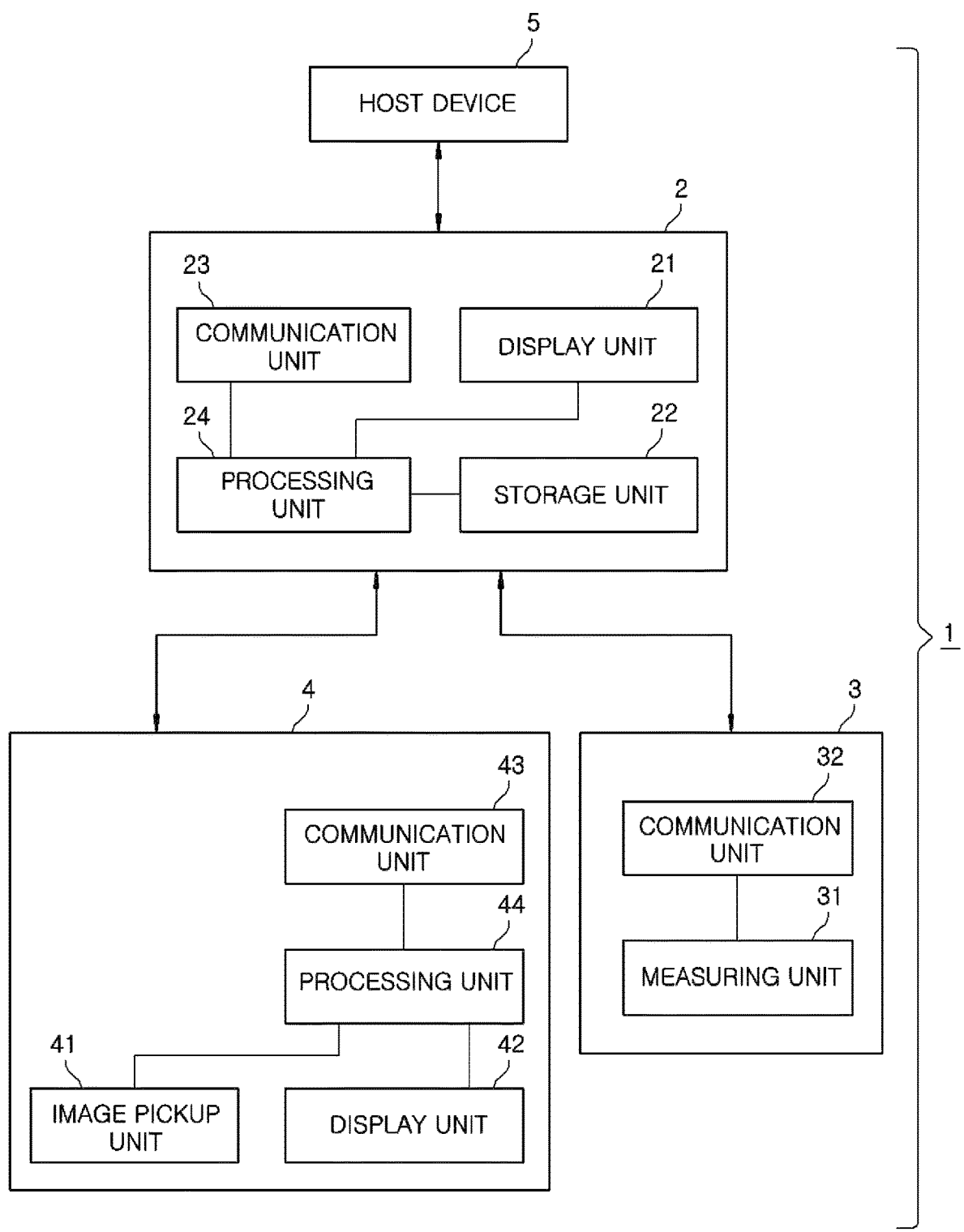
FIG. 1 is a schematic block diagram of a control device and a work management system according to an embodiment.
Figure 2:
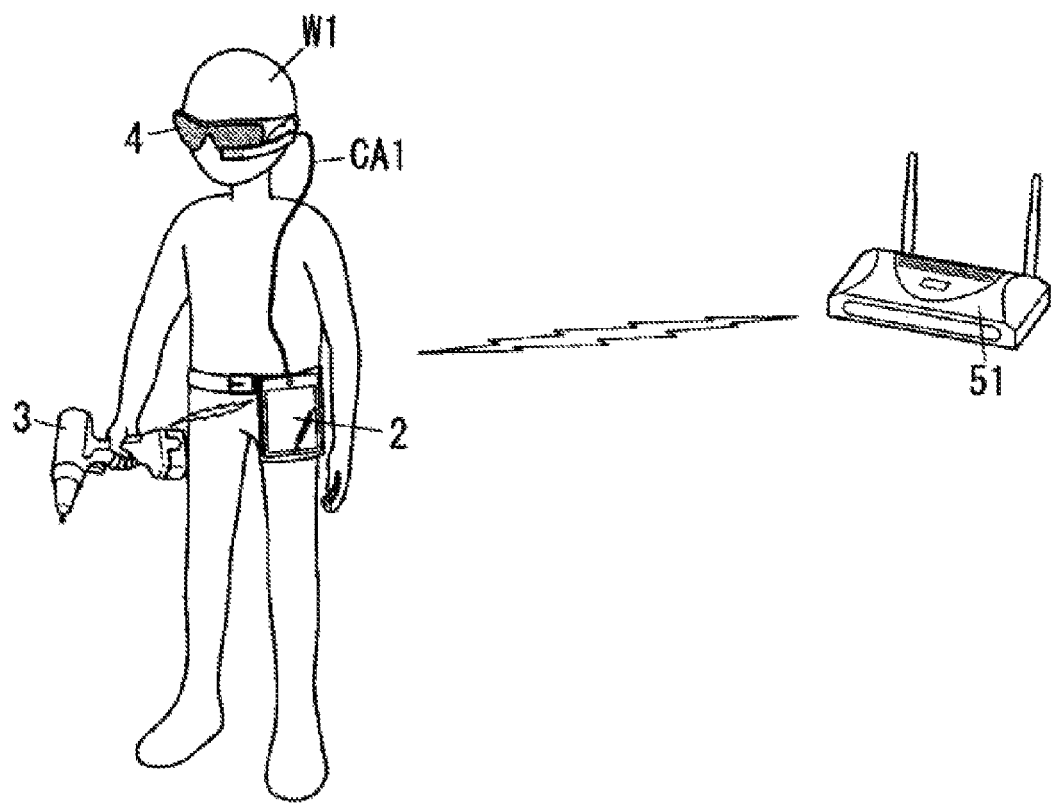
FIG. 2 is a schematic diagram showing an example of the work management system according to the embodiment.

As shown in FIGS. 1 and 2, a control device 2 according to an embodiment of the present invention includes a communication unit 23 and a processing unit 24. The communication unit 23 makes communication with a tool 3 which is used in a fastening work using a fastener (e.g., a screw 10) as well as an image pickup unit 41 for capturing an image of a working site where the fastening work is carried out. The processing unit 24 executes a process of determining whether or not the fastening work is being performed normally based on a fastening torque applied to the fastener by the tool 3 and an image captured by the image pickup unit 41.

Further, as shown in FIGS. 1 and 2, a work management system 1 according to the embodiment of the present invention includes the control device 2, the tool 3 and a wearable device 4. The tool 3 includes a communication unit 32 which transmits data on the fastening torque to the control device 2. The wearable device 4 includes the image pickup unit 41 and a communication unit 43 which transmits data on the captured image to the control device 2.

Hereinafter, the control device 2 and the work management system 1 according to the present embodiment will be described in detail. However, the following configurations described below are only examples of the present invention, and the present invention is not limited to the following embodiments. Thus, it will be understood by those skilled in the art that various changes and modifications may be made without departing from the scope of the present invention.

As shown in FIG. 1, the work management system 1 of the present embodiment includes the control device 2, the tool 3 and the wearable device 4. The work management system 1 further includes a host device 5 which makes communication with the control device 2.

The control device 2 includes a display unit 21, a storage unit 22, the communication unit 23 and the processing unit 24. The display unit 21 is formed of, e.g., a liquid crystal display, an organic EL (electro-luminescence) display or the like and is configured to display various information such as instructions for a worker W1 by using at least one of a message and an image. In the control device 2 of the present embodiment, the display unit 21 is formed of a touch panel-type liquid crystal display.

The storage unit 22 includes, e.g., an electrically erasable programmable read-only memory (EEPROM), a flash memory or the like and is configured to store various information such as applications which are operated by the processing unit 24. Further, the storage unit 22 stores, for each working site, data on the fastening torque transmitted from the tool 3 and data on the image captured by the wearable device 4. Besides, the storage unit 22 stores, for each working site, a torque (target torque) required when fastening the fastener, data on an image (instruction image) representing the working site where the work needs to be done by the worker W1, and an image (reference image) showing a normal state where the fastener is tightened properly. Here, the fastener is a member such as the screw 10 (see FIG. 6A) or a bolt.

An example of data stored in the storage unit 22 is shown in Table 1. Table 1 shows data for a case where the worker W1 tightens the screw 10 as the fastener. In Table 1, "No." is the number assigned to each working site where the work is to be done by the worker W1. Further, "Standard" represents a nominal size (e.g., 'M8', 'M10', etc.) of the fastener required for each working site.

applied to the fastener by the tool 3 and an image captured by the image pickup unit 41. The determination process will be described in detail later.

The control device 2 of the present embodiment is formed of a tablet-type portable electronic device as shown in FIG. 2. Therefore, the control device 2 is excellent in convenience since it can easily be carried by the worker W1 while the work is performed. However, the control device 2 is not limited to the tablet-type portable electronic device. For example, the control device 2 may be formed of a smartphone. Alternatively, the control device 2 may be formed of a programmable logic controller (PLC), a personal computer (PC) or the like. Further, the control device 2 preferably includes at least the communication unit 23 and the processing unit 24, and optionally includes the display unit 21 and the storage unit 22. For example, instead of the display unit 21, the control device 2 may be provided with an audio output unit (not shown) for outputting voice instructions about the work to the worker W1. Alternatively, the control device 2 may include both of the display unit 21 and the audio output unit.

The tool 3 is configured to apply a predetermined torque to the fastener so as to tighten the fastener to a workpiece 11 (see FIG. 6A). Here, the workpiece 11 is a target object, such as a wood plate or an iron plate, on which the work (in this case, the work of tightening the fastener) is done. As shown in FIG. 1, the tool 3 includes a measuring unit 31 configured to measure the fastening torque applied to the fastener and the communication unit 32 configured to make communication with the control device 2.

The tool 3 may be, e.g., a torque wrench, an electric impact driver or the like. An electric impact wrench may be another example of the tool 3. Further, the impact driver and

TABLE 1

| No. | Standard | Target Torque (N · m) | Instruction Image | Fastening Torque (N · m) | Reference Image | Captured Image |
|-----|----------|----------------------|-------------------|--------------------------|-----------------|----------------|
| 1   | M8       | 20 ± 10%             | A(1)              | 19.8                     | B(1)            | C(1)           |
| 2   | M10      | 40 ± 10%             | A(2)              | 39.6                     | B(2)            | C(2)           |
| .   | .        | .                    | .                 | .                        | .               | .              |
| .   | .        | .                    | .                 | .                        | .               | .              |
| .   | .        | .                    | .                 | .                        | .               | .              |
| N − 1 | M8     | 20 ± 10%             | A(N − 1)          | 18.5                     | B(N − 1)        | C(N − 1)       |
| N   | M10      | 40 ± 10%             | A(N)              | 40.5                     | B(N)            | C(N)           |

The communication unit 23 is formed of a communication module in compliance with wired and wireless communication standards (e.g., Bluetooth (registered trademark) and WiFi (registered trademark)). In the control device 2 of the present embodiment, the communication unit 23 makes wireless communication with the tool 3 and the host device 5, and makes wired communication with the wearable device 4 via a cable CA1 (see FIG. 2). However, the communication unit 23 may make wireless communication with the wearable device 4 and may make wired communication with the tool 3 and the host device 5 via respective cables (not shown).

The processing unit 24 includes, e.g., a CPU (central processing unit), and executes various processes by operating the applications stored in the storage unit 22. Specifically, the processing unit 24 executes a process of transmitting an instruction signal to the wearable device 4 by reading out the data on the instructions from the storage unit 22. Further, the processing unit 24 executes a process of determining whether or not the fastening work is being performed successfully by the worker W1 based on a fastening torque the impact wrench may be operated by, e.g., compressed air power other than electric power. Alternatively, the tool 3 may be a manual screwdriver. In any example of the tool 3, the tool 3 necessarily includes the communication unit 32, but may not necessarily include the measuring unit 31. If the tool 3 does not have the measuring unit 31, the tool 3 may transmit, as the fastening torque, a setting torque set by a torque limiter (which will be described later) to the control device 2.

Hereinafter, a torque wrench 300 and an impact driver 310 will be briefly described as examples of the tool 3 with reference to FIGS. 3 and 4.

Figure 3:
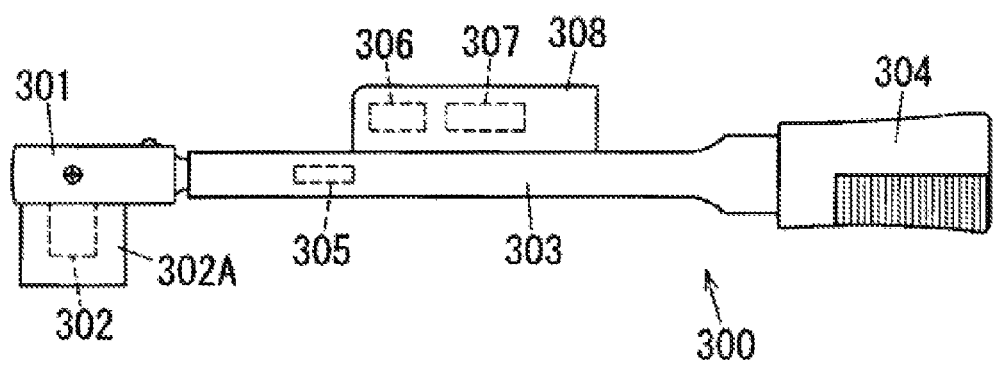
FIG. 3 is a schematic diagram showing an example of a tool in the work management system according to the embodiment.

The torque wrench 300 includes a head 301, an arm 303, a grip 304 and a case 308 as shown in FIG. 3. The arm 303 includes therein a magnetostrictive load cell (detecting unit) 305. The case 308 includes therein a CPU (torque calculating unit) 306 and a communication I/F (interface) 307.

The head 301 is a member serving as a rotation center when the fastening work is performed by the worker W1. At the head 301, a socket insert 302 to which a socket 302A is affixed is provided. The socket 302A is a member into which the fastener such as a bolt is fitted. By rotating the head 301 in a state where the fastener is fitted into the socket 302A while the socket 302A is affixed to the socket insert 302, it is possible to apply a predetermined torque to the fastener. In other words, the socket 302A corresponding to the nominal size of the fastener is mounted to the head 301, and the torque is applied to the fastener through the socket 302A by the rotation of the head 301. Further, at the socket insert 302, the socket 302A corresponding to the nominal size of the fastener may be appropriately affixed.

The grip 304 is a member gripped by the worker W1 when fastening the fastener. The grip 304 has a shape such that it can be easily gripped by the worker W1. The arm 303 is a rod-shaped member which transfers the force applied to the grip 304 to the fastener through the head 301. The arm 303 includes therein a torque limiter (not shown).

The torque limiter is a mechanism which is operated when a torque applied to the fastener reaches a preset torque value to prevent an excessive torque from being applied to the fastener. Since the torque limiter is a conventionally known mechanism, a detailed description thereof will be omitted. Further, the preset torque causing the torque limiter to be operated can be set by, e.g., an adjustment knob (not shown). The adjustment knob is also well known in the art, a detailed description thereof will be omitted.

The load cell 305 includes a strain gauge (not shown). The load cell 305 is slightly deformed depending on the torque applied whenever fastening the fastener. The load cell 305 measures a strain due to the deformation by using the strain gauge and outputs an electrical signal proportional to the strain to the CPU 306. That is, the load cell 305 outputs an electric signal corresponding to the torque applied to the fastener. The CPU 306 calculates a fastening torque based on the electric signal outputted from the load cell 305. That is, in the torque wrench 300, the load cell 305 and the CPU 306 correspond to the measuring unit 31.

The communication I/F 307 is formed of a communication module in compliance with the wireless communication standard (e.g., Bluetooth (registered trademark)). Here, the communication I/F 307 is configured to transmit a signal including data of the fastening torque calculated by the CPU 306 to the control device 2 through wireless communication using an antenna (not shown). That is, in the torque wrench 300, the communication I/F 307 corresponds to the communication unit 32. Alternatively, the communication I/F 307 may be configured to transmit the signal including the data of the fastening torque calculated by the CPU 306 to the control device 2 through wired communication using a cable (not shown).

Further, the torque wrench 300 may include a liquid crystal display (not shown), which is exposed on one surface of the case 308, to display information about the fastening torque and the like. With such configuration, the worker W1 is able to check the fastening torque immediately.

Figure 4:
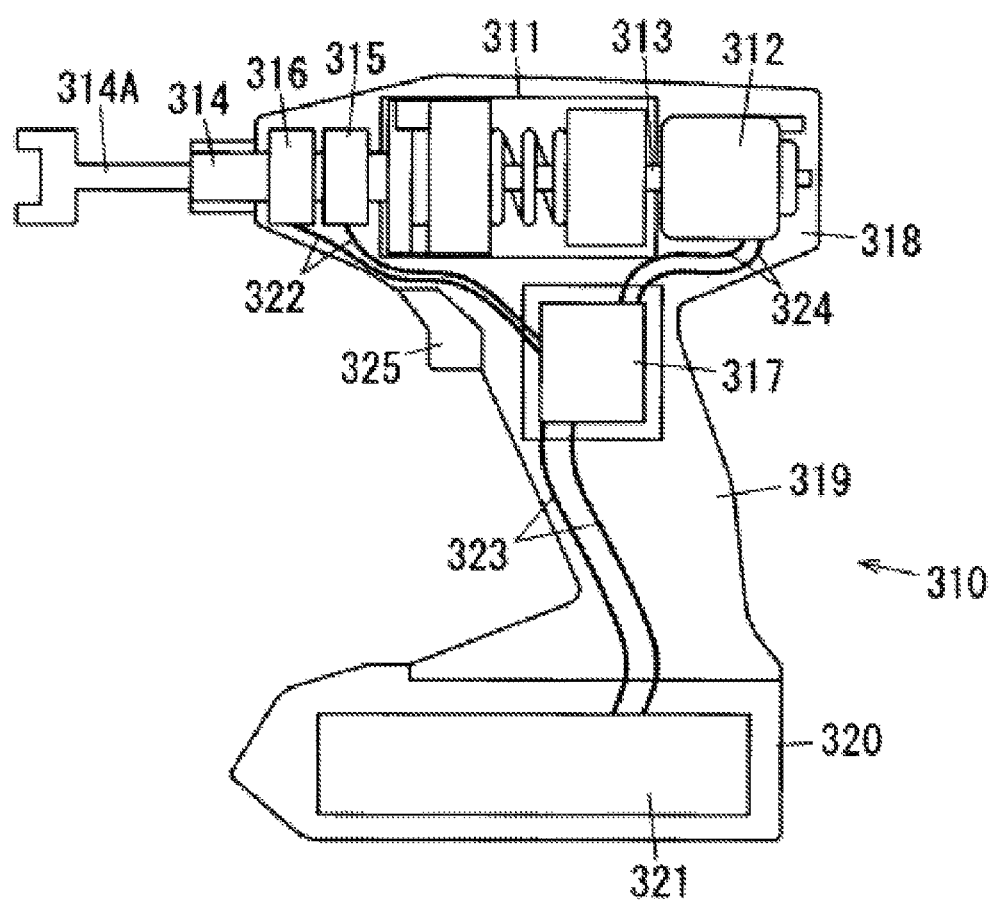
FIG. 4 is a schematic diagram showing another example of the tool in the work management system according to the embodiment.

The impact driver 310 includes an impact mechanism 311, a motor 312, an output shaft 314, a magnetostrictive torque sensor 316 (first detecting unit), an acceleration sensor 315 (second detecting unit) and a control circuit 317 (torque calculating unit) as shown in FIG. 4. Further, the impact driver 310 includes a cylindrical body 318 (body part) and a grip 319 which protrudes in a direction (downward in FIG. 4) intersecting an axial direction of the output shaft 314 from a circumferential surface of the body 318.

At one end of the grip 319 (a lower end of the grip 319 in FIG. 4), a battery pack 320 including a resin case and a rechargeable battery 321 accommodated in the resin case is detachably attached. The impact driver 310 is operated by electric power supplied from the rechargeable battery 321. Specifically, the impact driver 310 is operated by supplying the electric power from the rechargeable battery 321 to each of the motor 312 and the control circuit 317 through electric wires 323 and 324.

Further, the grip 319 is provided with an operation lever 325 which can be pushed in by the worker W1. A switch circuit (not shown) is mechanically connected to the operation lever 325. When the operation lever 325 is pushed in by the worker W1, the switch circuit outputs an operation signal to the control circuit 317.

The impact mechanism 311 is coupled to a shaft 313 of the motor 312. The impact mechanism 311 is configured to generate a pulse-like impact force according to the rotation of the shaft 313 and apply the generated impact force to the output shaft 314. That is, the impact mechanism 311 generates the pulse-like impact force. The motor 312 is formed of, e.g., a brushed DC (Direct Current) motor or a brushless DC motor. The motor 312 is accommodated in the body 318 such that the shaft 313 coincides with an axis of the body 318. A driving current is supplied to the motor 312 from the control circuit 317 through the electric wire 324. Further, an RPM (revolutions per minute) and a rotational speed of the shaft 313 of the motor 312 are controlled by the control circuit 317.

The output shaft 314 is rotatably attached to one end (left end in FIG. 4) of the body 318 so as to coincide with the axis of the body 318. The output shaft 314 is configured to be rotated by the impact force applied from the impact mechanism 311. At a front end of the output shaft 314, a bit 314A corresponding to the nominal size of the fastener such as the screw 10, a bolt or the like is affixed. By fitting the bit 314A into the fastener while the bit 241A is affixed to the output shaft 314, it is possible to apply a predetermined torque to the fastener by using the impact driver 310. That is, the bit 314A corresponding to the nominal size of the fastener is affixed to the output shaft 314, and the output shaft 314 is rotated by the impact force applied from the impact mechanism 311.

The torque sensor 316 is configured to measure, in a non-contact manner, a strain generated in the output shaft 314 by the torque applied to the output shaft 314 when fastening the fastener. Then, the torque sensor 316 outputs an electrical signal proportional to the strain to the control circuit 317 through an electric wire 322. That is, the torque sensor 316 measures a torque applied to the output shaft 314.

The acceleration sensor 315 is attached to a groove (not shown), which is formed by carrying out D-shaped cutting at a portion of the output shaft 314 for example. The acceleration sensor 315 is configured to detect at least one of an angular velocity of the output shaft 314 and a circumferential acceleration of the output shaft 314. The acceleration sensor 315 may further detect a radial acceleration of the output shaft 314 in addition to the circumferential acceleration of the output shaft 314.

Further, a pair of communication coils (not shown) are provided at the output shaft 314 to supply electric power to the acceleration sensor 315 and to transmit a detected value of the acceleration sensor 315 to the control circuit 317. One (first communication coil) of the communication coils is fixed to the circumferential surface of the output shaft 314. The other one (second communication coil) of the communication coils is formed in a cylindrical shape and the output shaft 314 passes through a center thereof. The second communication coil is arranged to face the first communication coil.

When the control circuit 317 supplies AC current to the second communication coil, the AC current flows through the first communication coil by the mutual induction. The acceleration sensor 315 converts the AC current flowing through the first communication coil into DC current and stores charges in, e.g., a capacitor (not shown) to thereby ensure an operating power. Further, the acceleration sensor 315 transmits the detected value to the control circuit 317 through the second communication coil and the electric wire 322 by supplying a pulse signal having a frequency different from that of the AC current inputted from the control circuit 317 to the first communication coil.

The control circuit 317 includes a microcomputer (microcontroller) and a communication module in compliance with the wireless communication standard (e.g., Bluetooth (registered trademark)). The control circuit 317 has a function of controlling the rotation of the shaft 313 of the motor 312 based on the operation signal outputted from the switch circuit in response to the pushing operation of the operating lever 325.

In the impact driver 310, the control circuit 317 calculates the fastening torque on the basis of an inertia torque of the output shaft 314 and the bit 314A calculated based on the detected value of the torque sensor 316 and the detected value of the acceleration sensor 315. That is, in the impact driver 310, the torque sensor 316, the acceleration sensor 315 and the control circuit 317 correspond to the measuring unit 31. Further, the control circuit 317 has a function of stopping the operation of the motor 312 when the calculated fastening torque reaches a preset torque value.

Further, the control circuit 317 has a function of transmitting a signal including data of the calculated fastening torque to the control device 2 through wireless communication using an antenna (not shown). That is, in the impact driver 310, the control circuit 317 corresponds to the communication unit 32. Alternatively, the control circuit 317 may be configured to transmit the signal including data of the calculated fastening torque to the control device 2 through wired communication using a cable (not shown).

The wearable device 4 is constituted by attaching the image pickup unit 41 and the display unit 42 to a device, e.g., glasses, a goggle or a helmet to be mounted on the head of the worker W1. In the work management system 1 of the present embodiment, the wearable device 4 is constituted by a glasses-type device as shown in FIG. 2 and includes the image pickup unit 41, the display unit 42, the communication unit 43 and the processing unit 44 as one unit.

The image pickup unit 41 is formed of, e.g., a CCD (charge-coupled device) image sensor or CMOS (complementary metal oxide semiconductor) image sensor. The capturing range of the image pickup unit 41 is substantially equal to the display range of the display unit 42, and also is substantially equal to the field of view of the worker W1 to whom the wearable device 4 is attached. Therefore, the image pickup unit 41 can capture a range approximate to the field of view of the worker W1. Further, since the capturing range of the image pickup unit 41 does not exactly coincide with the field of view of the worker W1, preferably, correction processing may be performed on the captured image so as to make the capturing range equal to the field of view of the worker W1. Further, as shown in FIG. 6A, the image pickup unit 41 captures an image so that the captured image is viewed from a direction perpendicular to an installation surface of the workpiece 11 (working site) (i.e., a direction perpendicular to the plane of FIG. 6A). Further, the "perpendicular" may not be exactly "perpendicular" in the strict sense.

The display unit 42 is formed of, e.g., a head-mounted display (HMD) or the like and is configured to display various information for the worker W1 by using at least one of the message and the image. The head-mounted display may be a projecting type display which enable observation of the image by forming a virtual image by using a half mirror or the like, or may be a projecting type display which forms an image directly on the retina by using the lens of the eyes.

The communication unit 43 is formed of a module in compliance with the wired communication standard and is configured to make communication with the control device 2 through the cable CA1. The communication unit 43 may be formed of a module in compliance with the wireless communication standard (e.g., Bluetooth (registered trademark). In this case, the communication unit 43 makes wireless communication between the control device 2 and the wearable device 4.

The processing unit 44 includes, e.g., a CPU and is configured to realize various processes by executing programs. Specifically, the processing unit 44 executes a process of capturing an image of the working site by using the image pickup unit 41 based on an instruction signal transmitted from the control device 2. Further, the processing unit 44 executes a process of displaying instruction contents for the worker W1 on the display unit 42 based on data included in the instruction signal transmitted from the control device 2. Additionally, the processing unit 44 executes a process of transmitting data of the image captured by the image pickup unit 41 to the control device 2.

The host device 5 is constituted by, e.g., a programmable logic controller (PLC), a personal computer (PC), a server and the like. The host device 5 has a function of communicating with the control device 2. In the work management system 1 of the present embodiment, the control device 2 makes wireless communication with the host device 5 through a wireless access point 51 (see FIG. 2) included in the host device 5. Further, the host device 5 has a function of collectively managing data transmitted from the control device 2. Specifically, the host device 5 stores, for each work, data of the captured image and data of the fastening torque transmitted from the control device 2 to thereby manage the history of the works performed by the worker W1.

A timing of transmitting data to the host device 5 from the control device 2 may be arbitrarily set. For example, the control device 2 may regularly transmit data to the host device 5, or may transmit data to the host device 5 at the time when all of the works are completed. Alternatively, the control device 2 may transmit data to the host device 5 when the control device 2 receives a request for data transmission from the host device 5.

Figure 5:
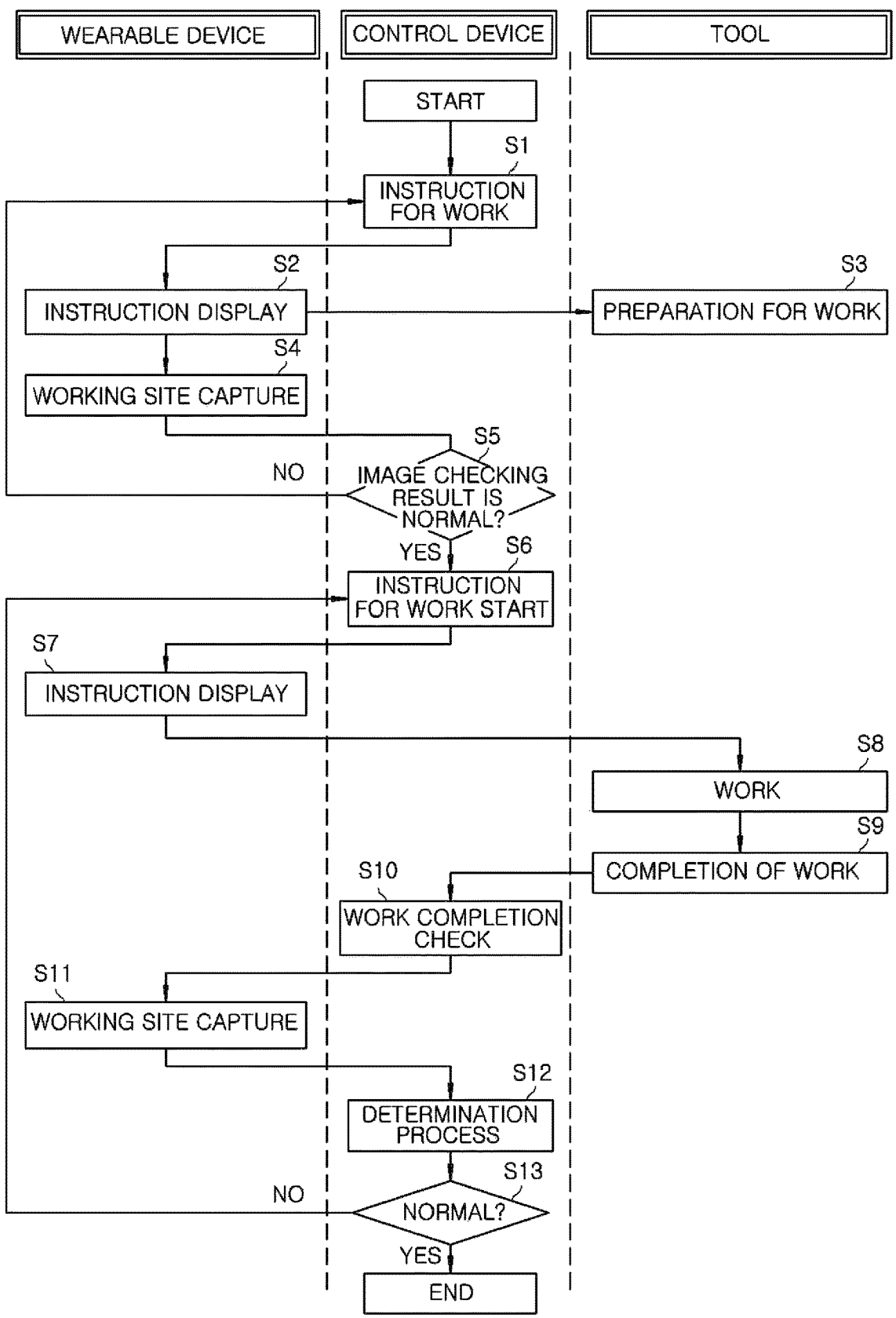
FIG. 5 is a flowchart showing an operation of the work management system according to the embodiment.

Hereinafter, an operation of the work management system 1 of the present embodiment will be described with reference to FIG. 5. First, when the worker W1 manipulates the control device 2 to start the work, the processing unit 24 of the control device 2 executes a process of transmitting an instruction signal including data of the work to the wearable device 4 (step S1). Alternatively, the processing unit 24 of the control device 2 may be triggered to execute the step S1 by the worker's manipulation on one of the tool 3 and the wearable device 4.

The processing unit 44 of the wearable device 4, upon receiving the instruction signal, executes a process of projecting (displaying) data of an instruction image representing the working site included in the instruction signal and other instruction data required for the work (e.g., the standard fastening torque and the nominal size of the screw 10) on the display unit 42 (step S2). The worker W1 identifies the working site by looking at the instruction image projected on the display unit 42. Further, the worker W1 makes preparations for the work using the tool 3 by looking at the instruction data (step S3). For example, when the tool 3 is the impact driver 310, the worker W1 installs the bit 314A corresponding to the nominal size of the screw 10 on the output shaft 314 or sets the setting torque.

Next, the worker W1 manipulates the image pickup unit 41 of the wearable device 4. This manipulation allows the processing unit 44 to execute a process of capturing an image of the working site and an area around the working site through the image pickup unit 41 (step S4). At this time, the worker W1 may adjust a position of the image pickup unit 41 prior to the capturing process, for example, by moving his/her head, such that the working site is positioned at the center of the field of view. Further, in the case of displaying a frame defining the capturing range on the display unit 42, the worker W1 may adjust the position of the image pickup unit 41, for example, by moving his/her head such that the working site is positioned in the frame. Then, the processing unit 44 executes a process of transmitting data of the captured image to the control device 2.

The processing unit 24 of the control device 2, upon receiving the data of the captured image, executes a process of checking whether or not the worker W1 would work in a correct working site by comparing the captured image with the instruction image of the working site stored in advance (step S5). In this checking process, for example, a similarity is evaluated by comparing the data of the captured image with the data of the instruction image. Then, it is determined as normal (that is, the worker W1 would work in a correct working site) if the evaluated similarity is equal to or greater than a predetermined threshold, and it is determined as abnormal (that is, the worker W1 would work in a wrong working site) if the evaluated similarity is smaller than the predetermined threshold. If it is determined as normal (YES in step S5), the processing unit 24 executes a process of transmitting to the wearable device 4 a start signal instructing the worker W1 to start the work (step S6).

Here, the "similarity" may be a digitized parameter indicative of the degree of similarities between the data of the captured image and the data of the instruction image. For example, a difference image between the captured image and the instruction image is obtained, and the similarity may be evaluated based on the number of pixels which have gray values smaller than a predetermined value in the difference image. Alternatively, for example, a difference image between the captured image and the instruction image is obtained and a binary image is obtained by binarizing the difference image. Then, labels are assigned to regions in the binary image and the similarity may be evaluated based on an area of each labeled region.

If it is determined as abnormal (NO in step S5), the processing unit 24 executes a process of transmitting to the wearable device 4 a signal instructing the worker W1 to capture an image of the working site again. Then, the sequence of the steps S1 to S5 is repeated until it is determined that the worker W1 would work in a correct working site.

The processing unit 44 of the wearable device 4, upon receiving the start signal, executes a process of projecting on the display unit 42 an image or a message of urging the worker W1 to start the work (step S7). The worker W1 starts the work using the tool 3 by looking at the image or the message projected on the display unit 42 (step S8). In this example, the worker W1 performs the task of tightening the screw 10 to the workpiece 11 by using the tool 3. In this case, the measuring unit 31 of the tool 3 measures the fastening torque applied to the screw 10 when tightening the screw 10. Once the work is completed, the communication unit 32 of the tool 3 performs a process of transmitting data of the fastening torque measured by the measuring unit 31 to the control device 2 (step S9).

Upon receiving the data of the fastening torque, the processing unit 24 of the control device 2 determines that the work by the worker W1 has been completed. Then, the processing unit 24 executes a process of transmitting, to the wearable device 4, a signal instructing the worker W1 to capture an image of the working site after the work (step S10). Upon receiving this instructing signal, the processing unit 44 of the wearable device 4 executes a process of projecting on the display unit 42 an image or a message of urging the worker W1 to capture an image of the working site after the work.

The worker W1 manipulates the image pickup unit 41 by looking at the image or the message displayed on the display unit 42. This manipulation allows the processing unit 44 to execute a process of capturing an image of the working site and an area around the working site through the image pickup unit 41 (step S11). At this time, similarly to the step S4, the worker W1 may adjust a position of the image pickup unit 41 prior to the capturing process, for example, by moving his/her head. Then, the processing unit 44 executes a process of transmitting data of the captured image to the control device 2.

Further, although the worker W1 captures an image of the working site and the area around the working site by manipulating the image pickup unit 41 in the steps S4 and S11, the capturing process may be performed automatically by the image pickup unit 41. For example, the image pickup unit 41 may automatically capture an image of the working site when the working site is positioned inside the frame displayed on the display unit 42.

The processing unit 24 of the control device 2, upon receiving the data of the captured image, executes a process of determining whether or not the work has been performed normally (successfully) based on the fastening torque acquired in advance and the data of the captured image (step S12). If it is determined as normal (YES in step S13), the processing unit 24 determines that the work in the current working site has been completed, and executes a process of transmitting an instruction signal for the next working site to the wearable device 4. If it is determined as abnormal (NO in step S13), the processing unit 24 executes a process of transmitting an instruction signal for the work to be performed successfully to the wearable device 4. Then, the sequence of the steps S6 to S13 is repeated until it is determined that the work by the worker W1 is performed successfully. Further, the sequence of the steps S1 to S13 is repeated until the work is completed for each and every working site.

In this example, if it is determined as abnormal in the step S13, the processing unit 24 of the control device 2 instructs the worker W1 to perform the same working task again. However, this instruction is optional, and it may be also possible for the processing unit 24 to instruct, after the work is completed for each and every working site, the worker W1 to perform the same working task again only for each unsuccessful work.

Hereinafter, the determination process in step S12 will be described in more detail. First, the processing unit 24 of the control device 2 executes a process of comparing the fastening torque transmitted from the tool 3 with a target torque. For example, for the work corresponding to "No. 1" of Table 1, the fastening torque measured by the tool 3 is 19.8 (N·m), which is within a range of the target torque of 20±10% (N·m). Therefore, in this case, the processing unit 24 determines that the screw 10 is sufficiently tightened. On the other hand, if the fastening torque is not within the range of the target torque, the processing unit 24 determines it as abnormal (that is, the work has been performed unsuccessfully).

Meanwhile, even though the fastener (here, the screw 10) is sufficiently fastened, it does not surely mean that the work has been performed normally. For example, as shown in FIG. 6A, when the screw 10 is not inclined with respect to the workpiece 11 (working site) as viewed from a direction perpendicular to an installation surface of the workpiece 11 (i.e., a direction perpendicular to the plane of FIG. 6A), it can be determined that the screw 10 has been tightened correctly (that is, the work has been performed successfully). On the other hand, as shown in FIG. 6B, when the screw 10 is inclined with respect to the workpiece 11 as viewed from the direction perpendicular to the installation surface of the workpiece 11, it can be determined that the screw 10 has not been tightened correctly (that is, the work has been performed unsuccessfully). Further, the "perpendicular" may not be exactly "perpendicular" in the strict sense.

Therefore, when it is determined that the fastener has been sufficiently fastened, the processing unit 24 executes a process of comparing data of the captured image with data of a reference image. For example, in this process, similarly to the step S5, a similarity is evaluated by comparing the data of the captured image with the data of the reference image. Then, it is determined as normal (that is, the work has been performed successfully) if the evaluated similarity is equal to or greater than a predetermined threshold, and it is determined as abnormal (that is, the work has been performed unsuccessfully) if the evaluated similarity is smaller than the predetermined threshold. For example, for the work corresponding to "No. 1" of Table 1, when the similarity evaluated by comparing data C(1) of the captured image with data B(1) of the reference image is equal to or greater than the predetermined threshold, the processing unit 24 determines it as normal (that is, the screw 10 has been fastened correctly to the workpiece 11). On the other hand, when the evaluated similarity is smaller than the predetermined threshold, the processing unit 24 determines it as abnormal (that is, the screw 10 has not been fastened correctly to the workpiece 11).

Further, in the determination process, the processing unit 24 may determine whether or not a diameter of the head 100 of the screw 10 matches up with its standard (e.g., 'M8', 'M10' and the like) by comparing the data of the captured image with the data of the reference image. For example, when a M8 screw is accidentally fastened in a working site where a M10 screw has to be fastened, the determination of the processing unit 24 is made as abnormal. Therefore, the processing unit 24 can determine whether or not the screw 10 of the standard appropriate for the working site is fastened.

Further, in the determination process, when the fastening torque has an abnormal value excessively greater than the target torque, the processing unit 24 may determine that there is an abnormality in the measuring unit 31 of the tool 3. In this case, by notifying the worker W1 of the abnormality occurred in the measuring unit 31 of the tool 3 through the tool 3 or the wearable device 4, it can be urged to repair or replace the tool 3.

Further, in the determination process, the processing unit 24 acquires the fastening torque regularly from the tool 3 during a time period (work period) from the start to the end of the work, and may determine whether or not the fastening work is successfully performed on the basis of data of the time series. For example, when the fastening torque is substantially constant in this work period, the processing unit 24 can determine that the fastening work has been performed successfully. On the other hand, when the fastening torque varies discontinuously in the work period, the processing unit 24 can determine that the fastening work has been performed unsuccessfully.

As described above, in the control device 2 and the work management system 1 of the present embodiment, it is determined whether or not the work by the worker W1 is being performed normally based on the fastening torque applied by the tool 3 to the fastener and the captured image of the working site taken by the image pickup unit 41. Accordingly, the control device 2 and the work management system 1 of the present embodiment can check whether or not the fastener has been fastened successfully (i.e., a state of the work using the tool 3). Therefore, with the control device 2 and the work management system 1 of the present embodiment, it is possible to improve work efficiency by providing appropriate instructions to the worker W1 depending on the state of the work. Furthermore, with the control device 2 and a work management system 1 of the present embodiment, it is also possible to reduce mistakes made by the worker W1 by checking the state of the work. Thus, there is an advantage that it is possible to improve the quality of a product made through the work.

In particular, in the control device 2 of the present embodiment, the processing unit 24 obtains the similarity in the determination process by comparing the captured image with the reference image showing the state in which the fastener is fastened normally in the working site. Further, the processing unit 24 determines whether or not the work is being performed normally based on the comparison result between the fastening torque and the target torque required for the work and the comparison result between the similarity and the predetermined threshold. With such configuration, it is possible to more accurately check whether or not the fastener has been fastened successfully. This configuration may be optionally employed.

Further, in the control device 2 of the present embodiment, upon receiving the data of the fastening torque, the processing unit 24 determines that the work by the worker W1 has been completed. Then, the processing unit 24 may execute a process of transmitting, to the wearable device 4, a signal instructing the worker W1 to capture an image of the working site after the work. Upon receiving this instructing signal, the image pickup unit 41 of the wearable device 4 may automatically capture an image of the working site. In other words, in the control device 2 of the present embodiment, the image capturing timing of the image pickup unit 41 may be determined by using the signal from the tool 3 as a trigger. In this configuration, the image capture of the image pickup unit 41 is performed at the timing when the worker W1 completes the work using the tool 3. Therefore, there is an advantage that it is possible to capture an image of the working site without the use of the hands of the worker W1. This configuration may be optionally employed.

Further, the control device 2 of the present embodiment includes the display unit 21 configured to display instructions about the work for the worker W1 by using at least one of a message and an image. In this configuration, it is possible to visually show the instructions to the worker W1. This configuration may be optionally employed.

Further, in the control device 2 of the present embodiment, the captured image is an image when the working site is viewed from the direction perpendicular to the installation surface. Therefore, the control device 2 can determine whether the fastener is fastened in the direction perpendicular to the installation surface, and thus it can be easily determined whether the fastener is fastened correctly on the installation surface. This configuration may be optionally employed.

Further, in the work management system 1 of the present embodiment, the wearable device 4 includes the display unit 42 configured to display instructions about the work for the worker W1 transmitted from the control device 2 by using at least one of a message and an image. Therefore, in this work management system 1, the worker W can easily check the instructions about the work by simply orienting his/her eyes to the wearable display unit 42. This configuration may be optionally employed.

Further, in the work management system 1 of the present embodiment, it is preferable that the tool 3 is the torque wrench 300 having the head 301, the load cell (detecting unit) 305 and a CPU (torque calculating unit) 306. In this configuration, it is possible to obtain a fastening torque by measuring a torque actually applied to the fastener from the tool 3. Therefore, it can be accurately determined whether the work has been performed successfully. The use of the torque wrench 300 as the tool 3 is optional.

The tool 3 may be the impact driver 310 having the impact mechanism 311, the output shaft 314, the magnetostrictive torque sensor 316 (first detecting unit), the acceleration sensor 315 (second detecting unit), and the control circuit 317 (torque calculating unit). Also in this configuration, it is possible to obtain a fastening torque by measuring a torque actually applied to the fastener from the tool 3. Therefore, it can be accurately determined whether the work has been performed successfully. The use of the torque wrench 300 as the tool 3 is optional.

Further, in the work management system 1 of the present embodiment, the wearable device 4 is a device to be mounted on the head of the worker W1 such as protective glasses, a goggle, or a helmet. In this configuration, since the field of view of the worker W1 is substantially the same as the capturing range of the image pickup unit 41, it is advantageous in that it is easy to capture an image of the working site. Further, in this configuration, since the information such as the instructions about the work is projected on the display unit 42 present in the field of view of the worker W1 without being aware of it, it is advantageous in that the worker W1 can easily perform the work, and hardly overlooks the instructions about the work. This configuration may be optionally employed.

Further, in the work management system 1 of the present embodiment, at least one of the wearable device 4 and the control device 2 may have a function of outputting voice instructions about the work for the worker W1. In this configuration, it is possible to provide the instructions about the work to the worker W1 through auditory communication. Thus, the work can be easily performed since the worker W1 does not need to interrupt the work. This configuration may be optionally employed.

Further, the work management system 1 of the present embodiment includes the host device 5. The host device 5 stores, for each work, the data of the captured image and the data of the fastening torque transmitted from the control device 2. In this configuration, by using the host device 5, it is possible to manage the history of the works performed by the worker W1. Thus, it is advantageous in that the work management and the quality control can be easily carried out together.

Furthermore, in the work management system 1 of the present embodiment, the host device 5 may store information about devices (e.g., the tool 3 and the wearable device 4) electrically connected to the control device 2. The information about each device may include, e.g., corrective information of various parameters of the device, position information of the device, information of the worker W1 handling the device, information of the time at which the work using the device is performed and the like. In this configuration, not only the fastening torque for each work can be managed, but also the devices connected to the control device 2 and the worker W1 handling the work can be managed. Thus, the work management can be carried out in a more detailed manner. For example, in this configuration, it is possible to change a working plan to more precisely perform the work by referring to the history of working hours or the working skill of the worker W1 handling the device. Further, in this configuration, it is also possible to provide individual guidance, such as reading a working manual, to the worker W1 with low working skill.

It is optional for the work management system 1 to include the host device 5. If the work management system 1 does not include the host device 5, it is preferable that the storage unit 22 of the control device 2 stores the data of the fastening torque, the data of the captured image and the information about devices for each work. With this configuration, the control device 2 can have the same function as that of the host device 5.

Figure 7A:
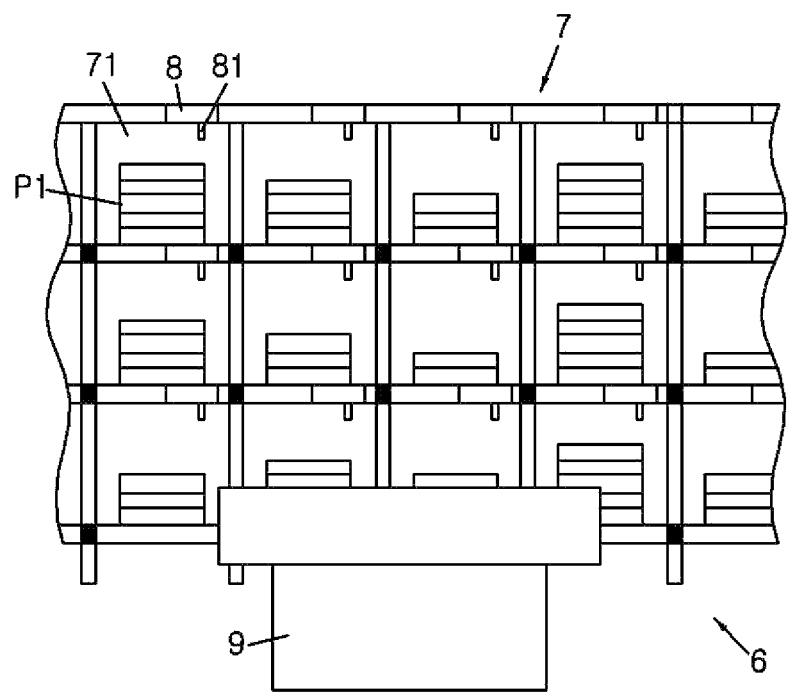
FIG. 7A is a schematic diagram of a part management system and FIG. 7B is a schematic block diagram of the part management system to which the work management system according to the embodiment is applied.
Figure 7B:
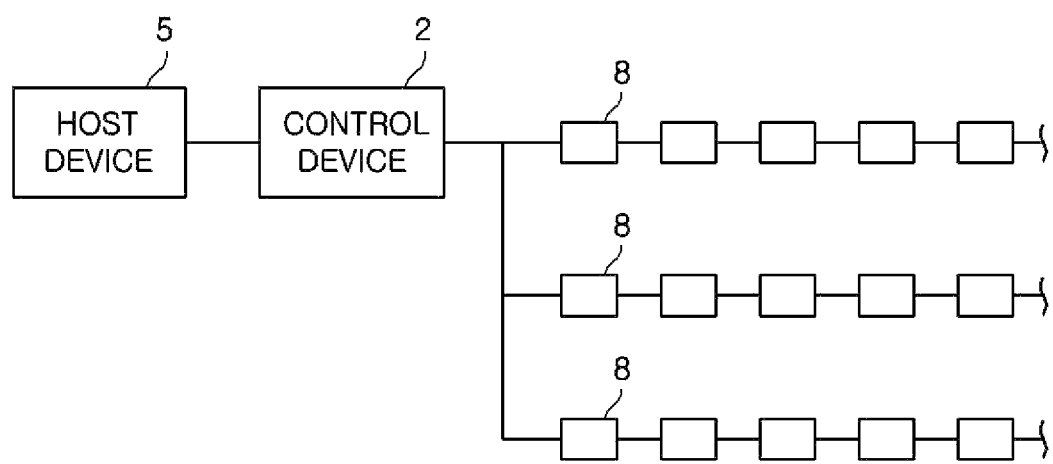

Meanwhile, the work management system 1 of the present embodiment may be used in conjunction with a part management system 6 shown in FIGS. 7A and 7B. The part management system 6 is a system used in a so-called cell production method of taking parts P1 out sequentially from a plurality of part boxes 71 and assembling the extracted parts P1 according to a predetermined production plan. As shown in FIGS. 7A and 7B, the part management system 6 includes a shelf 7 consisting of the plurality of part boxes 71, a plurality of display devices 8 respectively mounted on the part boxes 71 in a one-to-one relationship, and a work platform 9 where the worker W1 performs the work. In each of the part boxes 71, the parts P1 are arranged. Different types of parts P1 may be disposed in the respective part boxes 71. Alternatively, the same type of parts P1 may be disposed in some of the part boxes 71. In the part management system 6, the control device 2 of the present embodiment controls the plurality of display devices 8.

The display devices 8 are electrically connected to the control device 2 by cables (not shown). Each of the display devices 8 is configured to be turned on in response to a signal transmitted from the control device 2. The control device 2 is configured to turn on one of the display devices 8 according to the predetermined production plan to urge the worker W1 to take out the parts P1 from the part box 71 corresponding to the turned-on display device 8. Further, each of the display devices 8 is provided with a switch (or a lever) 81 operable by the worker W1. Each display device 8 can be turned off by manipulating the switch 81 by the worker W1 in a state in which the display device 8 is turned on.

Hereinafter, an operation of the control device 2 in the part management system 6 will be described in detail. The processing unit 24 of the control device 2 determines, based on a signal outputted from one display unit 8 by manipulating the switch 81, that a part P1 has been extracted from a part box 71 corresponding to the display unit 8. When it is determined that the part P1 has been extracted, the processing unit 24 executes a process of transmitting to the wearable device 4 a signal instructing the worker W1 to capture an image of the extracted part P1. Upon receiving the above instruction signal, the processing unit 44 of the wearable device 4 executes a process of projecting on the display unit 42 an image or a message of urging the worker W1 to capture an image of the extracted part P1.

The worker W1 manipulates the image pickup unit 41 by looking at the image or the message projected on the display unit 42. By this manipulation, the processing unit 44 executes a process of capturing an image of the extracted part P1 through the image pickup unit 41. Alternatively, the processing unit 44 may execute a process of automatically capturing an image of the extracted part P1 through the image pickup unit 41 upon receiving the signal from the control device 2. Then, the processing unit 44 executes a process of transmitting data of the captured image to the control device 2.

The processing unit 24 of the control device 2, upon receiving the data of the captured image, executes a process of checking whether or not the worker W1 has extracted a correct part by comparing the captured image with a reference image of the part P1 stored in advance. In other words, the processing unit 24 executes a process of determining whether or not the correct part P1 is extracted from any one of the plurality of the part boxes 71 by comparing the captured image of the extracted part P1 obtained by the image pickup unit 41 with the reference image of the part P1 stored in advance. In this process, for example, a similarity is evaluated by comparing the data of the captured image with the data of the reference image of the part P1. Then, it is determined as normal (that is, the worker W1 has extracted a correct part P1) if the evaluated similarity is equal to or greater than a predetermined threshold set in advance, and it is determined as abnormal (that is, the worker W1 has extracted an incorrect part P1) if the evaluated similarity is smaller than the predetermined threshold.

If it is determined as normal, the processing unit 24 executes a process of turning on a display device 8 corresponding to a part box 71 in which a part P1 to be extracted subsequently is accommodated. If it is determined as abnormal, the processing unit 24 executes, e.g., a process of flickering a display device 8 corresponding to a part box 71 in which a correct part P1 is accommodated, or a process of transmitting to the wearable device 4 a signal instructing the worker W1 to extract a correct part P1.

In this configuration, it is advantageous in that the control device 2 can manage the work of assembling the extracted part P1 (in this embodiment the work of fastening the fastener) together with the work of extracting the part P1 in the previous step. Further, in this configuration, if it is determined in the determination process that the worker W1 has extracted an incorrect part P1, the control device 2 notifies the worker W1 of the determination result, thereby urging the worker W1 to extract a correct part P1.

In the control device 2 and the work management system 1 of the present embodiment, the determination process is performed for the work of fastening the fastener. However, the determination process may be performed for other working tasks. For example, in a case where a drilling work is to be performed on the workpiece 11, the tool 3 transmits data of a torque applied to the workpiece 11 during the drilling work to the control device 2. Further, the image pickup unit 41 captures a working site where a hole is formed after the drilling work. Then, the processing unit 24 of the control device 2 executes a process of determining that the hole formed in the workpiece 11 has a sufficient size if the torque transmitted from the tool 3 exceeds a target torque. Further, the processing unit 24 obtains a similarity by comparing data of the captured image with data of a reference image, and executes a process of determining whether or not the hole has been correctly and successfully drilled into the workpiece 11 by comparing the similarity with a threshold set in advance.

Further, in the work management system 1 of the present embodiment, the image pickup unit 41 is provided in the wearable device 4. However, the image pickup unit 41 may be provided in the tool 3, for example. In this case, the tool 3 may have a function of executing a process of capturing an image of the working site by using the image pickup unit 41 based on an instruction signal transmitted from the control device 2 and a process of transmitting data of the image captured by the image pickup unit 41 to the control device 2.

Further, in the work management system 1 of the present embodiment, although the wireless communication using Bluetooth (registered trademark) is performed between the control device 2 and the host device 5, the wireless communication using the wireless communication standard such as WiFi (registered trademark), ZigBee (registered trademark) or the like may be performed therebetween. Further, the mobile communication standard such as LTE (long term evolution) for mobile devices may be used for the wireless communication between the control device 2 and the host device 5. The wireless communication using the mobile communication standard is particularly effective, for example, when the control device 2 is installed outdoors and the worker W1 performs work outdoors.

Further, it is particularly preferable that the wireless communication is performed by using the mobile communication standard for mobile devices because established services, which are provided through the mobile network, such as location-based service using GPS (global positioning system) and a weather forecast, can also be used. That is, in this case, since the location of the control device 2 can be specified by the GPS, it becomes possible for the host device 5 to manage the locations of the control device 2 and the worker W1. Further, it is possible to check the environment (e.g., hot and humid climate) of an area where the control device 2 is located through the weather forecast. Therefore, it is possible for the host device 5 to estimate and manage the lifetime of the devices including the tool 3 and the wearable device 4 according to the use environment of the control device 2.

Further, in the work management system 1 of the present embodiment, the tool 3 may be a battery-operated device (e.g., the impact driver 310) using a rechargeable battery (secondary battery) 321. In this configuration, a cable between the tool 3 and a power source, or a cable between the tool 3 and a compressed air source (air compressor) becomes unnecessary. Thus, the worker W1 can easily handle the tool 3 without regard to cables.

Further, in the work management system 1 of the present embodiment, the control device 2 is configured to control a single tool 3 and a single wearable device 4. However, the control device 2 may be configured in a different way. For example, the control device 2 may be configured to control each of a plurality of sets, each including the tool 3 and the wearable device 4. Further, in the work management system 1 of the present embodiment, the host device 5 is configured to make communication with a single control device 2. However, the host device may be configured to make communication with each of a plurality of control devices 2.

What is claimed is:

1. A work management system comprising:
a control device; and
a tool,
wherein the control device includes:
    a communication unit configured to make communication with the tool used during a work of fastening a fastener by a worker and further make communication with an image pickup unit configured to capture an image of a working site where the work is performed; and
    a processing unit configured to execute a determination process of determining whether or not the work is being performed successfully based on a fastening torque applied to the fastener by the tool and the image captured by the image pickup unit,
wherein the processing unit obtains, in the determination process, a similarity by comparing the captured image with a reference image showing a state in which the fastener is successfully fastened in the working site, and the processing unit determines whether or not the work is being performed successfully based on a comparison result between the fastening torque and a target torque required for the work and a comparison result between the similarity and a threshold set in advance,
wherein the processing unit determines whether or not the fastener is inclined with respect to a workpiece based on the similarity obtained by comparing the captured image with the reference image and determining whether or not the fastener is inclined with respect to the workpiece includes determining whether or not the fastener is fastened in a direction perpendicular to an installation surface of the workpiece,
wherein the tool is an impact driver including:
    an impact mechanism configured to generate a pulse-like impact force;
    an output shaft to which a bit corresponding to a nominal size of the fastener is affixed, the output shaft being rotated by the impact force applied from the impact mechanism;
    a first detecting unit configured to detect a torque applied to the output shaft; and
    a second detecting unit configured to detect at least one of an angular velocity of the output shaft and a circumferential acceleration of the output shaft, and
wherein the work management system further comprises a torque calculating unit configured to calculate the fastening torque based on a detected value of the first detecting unit and a detected value of the second detecting unit.

2. The work management system of claim 1, wherein the tool includes a communication unit configured to transmit data of the fastening torque to the control device,
wherein the work management system further comprises a wearable device including a communication unit configured to transmit data of the image pickup unit and the captured image to the control device.

3. The work management system of claim 2, wherein the wearable device further includes a display unit configured to display instructions about the work for the worker transmitted from the control device by using at least one of a message and an image.

4. The work management system of claim 1, wherein the torque calculating unit configured to calculate the fastening torque on a basis of an inertia torque calculated based on the detected value of the first detecting unit and the detected value of the second detecting unit.

5. The work management system of claim 2, wherein the wearable device is a device to be mounted on the worker's head.

6. The work management system of claim 2, wherein at least one of the wearable device and the control device is configured to output voice instructions about the work for the worker.

7. The work management system of claim 2, further comprising a host device configured to make communication with the control device,
wherein the host device stores, for each work, data of the captured image and data of the fastening torque transmitted from the control device.

8. The work management system of claim 7, wherein the host device stores information about devices electrically connected to the control device.

9. The work management system of claim 2,
wherein in a part management system including a plurality of part boxes each containing parts and a plurality of display devices mounted on the part boxes in a one-to-one relationship, the control device is configured to turn on one of the display devices according to a progress status of a work of extracting the parts to urge the worker to extract a part from the part box corresponding to said one of the display devices, and
the processing unit further executes a process of determining whether or not a correct part has been extracted from the part box corresponding to said one of the display devices by comparing an image of the extracted part captured by the image pickup unit with a reference image of the part stored in advance.

10. The work management system of claim 1, wherein the processing unit further determines whether or not the nominal size of the fastener matches with a standard of the fastener required for the working site based on the similarity.

* * * * *